United States Patent
Chattopadhyay et al.

(10) Patent No.: US 11,463,788 B1
(45) Date of Patent: Oct. 4, 2022

(54) FAST DIRECT RESOURCE ALLOCATION IDENTIFIER

(71) Applicant: Conviva Inc., Foster City, CA (US)

(72) Inventors: Biplab Chattopadhyay, Milpitas, CA (US); Weijia Li, Foster City, CA (US); Sudhi Nada, San Jose, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 17/326,674

(22) Filed: May 21, 2021

Related U.S. Application Data

(60) Provisional application No. 63/110,903, filed on Nov. 6, 2020.

(51) Int. Cl.
*H04N 21/84* (2011.01)
*H04N 21/845* (2011.01)
*H04N 21/262* (2011.01)

(52) U.S. Cl.
CPC ........... *H04N 21/84* (2013.01); *H04N 21/262* (2013.01); *H04N 21/845* (2013.01)

(58) Field of Classification Search
CPC ..... H04N 21/262; H04N 21/84; H04N 21/845
(Continued)

(56) References Cited

U.S. PATENT DOCUMENTS

| | | | | |
|---|---|---|---|---|
| 6,324,519 B1 * | 11/2001 | Eldering | ................ | G06Q 30/02 705/14.65 |
| 2011/0082750 A1 * | 4/2011 | Beatty | .................... | G06Q 30/02 705/14.66 |
| 2013/0212611 A1 * | 8/2013 | Van Aacken | ...... | H04N 21/4622 725/23 |

(Continued)

*Primary Examiner* — Dominic D Saltarelli
(74) *Attorney, Agent, or Firm* — Van Pelt, Yi & James LLP

(57) ABSTRACT

Resource allocation includes generating a resource allocation identifier corresponding to a resource allocation request. The resource allocation request pertains to allocation of a resource associated with streaming of an audiovisual content item. The resource allocation identifier comprises a first portion and a second portion, the first portion comprising a key, and the second portion comprising information associated with contextual metadata pertaining to the corresponding resource allocation request. It further includes performing a first transmission of a first message including the resource allocation identifier. The first message including the resource allocation identifier is directed to a first address associated with a first entity. It further includes performing a second transmission of a second message. Transmission of the second message causes transmission of the resource allocation request. The second message is directed to a second address associated with a second entity. The first address and the second address are different.

Resource allocation includes receiving a first message comprising a resource allocation identifier. It further includes, at a time subsequent to receiving the first message, receiving a second message comprising a resource allocation request pertaining to allocation of a resource associated with streaming of an audiovisual content item. It further includes matching the resource allocation request with the resource allocation identifier. It further includes, based at least in part on the match, receiving contextual metadata associated with the resource allocation request. It further includes facilitating resource allocation at least in part by using the contextual metadata.

19 Claims, 7 Drawing Sheets

(58) Field of Classification Search
USPC .......................................................... 725/32
See application file for complete search history.

(56) References Cited

U.S. PATENT DOCUMENTS

2014/0282720 A1\* 9/2014 Heck ................ H04N 21/25833
 725/35
2018/0075493 A1\* 3/2018 Agarwal ................. H04L 67/55

\* cited by examiner

FAST DIRECT RESOURCE ALLOCATION IDENTIFIER

CROSS REFERENCE TO OTHER APPLICATIONS

This application claims priority to U.S. Provisional Patent Application No. 63/110,903 entitled FAST DIRECT RESOURCE ALLOCATION IDENTIFIER filed Nov. 6, 2020 which is incorporated herein by reference for all purposes.

BACKGROUND OF THE INVENTION

In existing real-time programmatic bidding eco-systems, any new piece of information about a bidding opportunity that the publisher wants to send to real-time bidders needs to be sent over real-time bidding paths using heterogeneous interfaces defined between the different components involved. Lack of standardization of most of these interfaces, and involvement of multiple different vendors and service providers (e.g., ad stitchers, ad servers, supply side platforms (SSPs), etc.), makes introducing and managing new information and changes difficult. There is also another issue. Because the bid requests are distributed across a number of demand side partners by the SSPs for open bidding, publishers have very little control over with whom, when, and which information they want to share for real-time bidding (e.g., for targeting purposes). This is a problem in the connected TV ecosystem, where publishers are concerned about sharing information with a wide array of ecosystem entities.

BRIEF DESCRIPTION OF THE DRAWINGS

Various embodiments of the invention are disclosed in the following detailed description and the accompanying drawings.

DETAILED DESCRIPTION

Figure 1:
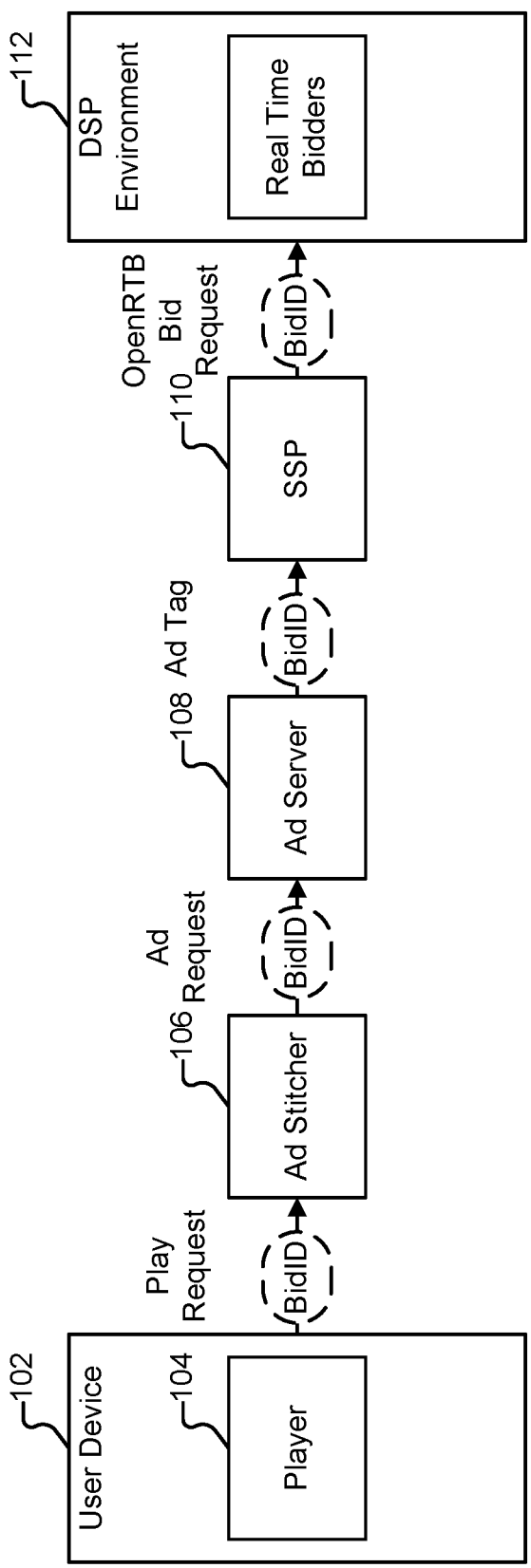
FIG. 1 illustrates an embodiment of a programmatic advertisement ecosystem.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for resource allocation. In various embodiments, the resource allocation techniques described herein are used to identify corresponding resource allocation requests and resource allocation identifiers that were sent via different communication paths. In various embodiments, the resource allocation techniques described herein provide technical solutions to technical problems with existing resource allocation systems, such as technical problems with respect to efficiency, privacy, security, and data exposure when performing resource allocation. Using the techniques described herein, improved resource allocation that is efficient, secure, and privacy-preserving and that also allows for control of data exposure in ecosystems such as real-time resource allocation ecosystems is provided.

While embodiments involving resource allocation ecosystems such as real-time programmatic bidding eco-systems for connected TV are described below for illustrative purposes, the resource allocation techniques described herein may be variously adapted to accommodate any other types of resource allocation ecosystems.

The existing connected TV advertising ecosystem has historically been a closed environment that is operated in a publisher-controlled manner. Publishers, whether a blogger, a website, a news outlet in the digital world, or a video site, typically interface with an advertisement server (e.g., Google), where the publishers register their inventory or supply of advertisement slots (that they offer for sale to be filled with ads, for example). A slot may be a slot on a website, or a slot on a particular video for video advertisements. Publishers also communicated with brands (or the brands approached publishers), where the brands indicated a demand for the advertisement slots in the particular ad server, and a desire to fill the slots supplied by a publisher with their advertisements (e.g., to serve ads on a particular advertisement server, with access to certain demographic information). Thus, historically, existing connected TV advertising ecosystems were established as a tri-party system between the publisher, the ad server, and the brand.

Programmatic advertising has also emerged. In a programmatic advertising ecosystem, a publisher registers its inventory of advertisement slots. However, the publisher is less concerned with which particular advertisement is served based on direct relationships with brands. This has been beneficial for smaller publishers, especially in the digital world. Here, instead of having to have a direct relationship with a brand, the publisher indicates criteria on what types of advertisements should be served. That is, the publisher with the supply of advertisement slots is not necessarily aware of the brand or entity that will purchase the advertisement slot and fill it with an advertisement.

The programmatic ad ecosystem is divided into two sides. On one side is the supply side, and the other is the demand side. The publisher is on the supply side (as the publisher provides a supply of advertisement slots). The demand side includes entities that have a demand for advertisement slots to fill. That is, the demand side includes entities such as brands that wish to purchase advertisement slots to fill them with advertisements. The programmatic advertisement ecosystem is automated. This is because when a user is clicking into a website, or on a player to play a particular video, there is a short amount of time (e.g., a fraction of a second) to decide which advertisement should be played for the user, and how much to pay the publisher for filling an advertisement slot with an advertisement.

That is, the process of bidding on an advertisement slot and deciding what advertisement to fill the slot should be performed in a very low-latency manner (e.g., where the entire process is completed in 100 milliseconds or less). Further, the process occurs at high-scale. That is, the programmatic advertisement process is a low-latency, high-scale environment.

In order to address the low-latency, high-scale nature of the programmatic advertisement ecosystem, various low-latency technologies have been put into place. Entities or components such as supply-side platforms (SSPs) and demand-side platforms (DSPs) were established. The DSPs include demand-side partners, where the demand is from entities such as brands. Thus, the demand-side platforms are partners for the brands. The supply-side platforms include supply-side partners that are working with publishers (e.g., to facilitate providing a supply of advertisement slots on behalf of the publishers).

In existing real-time programmatic bidding eco-systems, any new piece of information about a bidding opportunity that the publisher wants to send to the real-time bidders needs to be sent over the real-time bidding path using the heterogeneous interfaces defined between the different components involved. Lack of standardization of most of these interfaces, as well as involvement of multiple different vendors and service providers (e.g., ad stitchers, ad servers, SSPs), makes introducing and managing new information and changes quite difficult. There is also another issue. Because the bid requests are distributed across a number of demand side partners/platforms (DSPs) by the SSPs for open bidding, the publisher has very little control over with whom, when, and which information they want to share for real-time bidding, particularly for targeting purposes. This problem is even more prevalent in the connected TV ecosystem, where publishers are concerned about having to share information with a wide array of ecosystem entities. While the standard bidding path could be modified, this may require working with a wide variety of players in the ecosystem (e.g., ad stitchers, ad servers, SSPs) who mostly lack any direct interest in the information being transferred.

In various embodiments, the direct path resource allocation techniques described herein (also referred to herein as direct path synchronization techniques) may be used to securely and efficiently share publisher approved information with one or more partner DSPs, in real-time, without requiring any involvement of the existing bidding-path ecosystem intermediate entities and interfaces. In various embodiments, this establishes more control for the publisher over the data shared, facilitates faster solution deployment, and requires significantly less dependency on other programmatic ecosystem components.

FIG. 1 illustrates an embodiment of a programmatic advertisement ecosystem. In the example of FIG. 1, an existing programmatic advertisement ecosystem is shown. In this example, the inventory/supply of advertisement slots (e.g., ad request, which indicates availability of an advertisement slot to be filled) proceeds from the publisher, through an advertisement server (108) and SSP (110), to the demand side, which includes the DSP (112), and then the brand that will bid on advertisement slots in which to include the brand's advertisements.

As described above, the programmatic advertisement ecosystem facilitates real-time resource transactions (bidding on advertisement slots that are available to fulfill an advertisement slot and selection of advertisements).

Consider, for example, the case of real-time programmatic advertisements when playing video. Suppose that a user (using user device 102) opens their player 104 (e.g., by opening a video app for a publisher). A request for an advertisement to fill an available advertisement slot (e.g., to fill a pre-roll ad that will be displayed before user selected content is displayed) is sent from the player (e.g., via the indication of a play request, for which advertisements will be played in conjunction with).

As shown in this example, the request is sent through the programmatic ecosystem, passes through, for example, another server-side advertisement insertion (SSAI) server (e.g., ad stitcher 106), which then forwards the request to an advertisement server 108 (e.g., Google, Freewheel, a publisher's own ad server, etc.). The advertisement server then determines that the option to satisfy this ad request should be placed on an open market for bidding.

For example, the advertisement server forwards the ad request to the SSP 110. The SSP, using for example a standardized protocol such as OpenRTB (provided by the standards body, Interactive Advertising Bureau (IAB)), communicates with one or more DSPs (e.g., DSP 112), indicating to the DSPs the presence of an ad opportunity. The DSPs operate on behalf of various brands. Based on, for example, demographic or other targeting data, the DSP selects a particular brand's advertisement to fulfill the available advertisement slot for which a request for an ad has been made.

That is, the DSP is configured to select an appropriate advertisement for that particular advertisement slot. The advertisement slot is defined not only by what video the ad will be shown in conjunction with, but information pertaining to the user who is watching the video, the current time, a geographic location, as well as various other parameters. This various targeting or demographic information comes through the above described path in real-time, along with the request, where such demographic parameters are included in the advertisement request that is forwarded through the various entities along the real-time path.

There are various challenges and issues with the existing programmatic ecosystem.

Scaling: Existing solutions depend on sending a resource allocation identifier (e.g., bid identifier, or bidID) that includes contextual metadata for the targeting from the player in real-time through the complex and heterogeneous ecosystem of a programmatic ecosystem, as shown in the example of FIG. 1. The full path from the player to the DSP involves, for example, Ad Stitcher, Ad Server, and the SSP. These are different components often built by different companies. Each component has multiple providers in the ecosystem. The interfaces between them are non-standard. Thus, scaling this existing solution involves working with all these partners, and working through all these interfaces with their different possible combinations. In short, scaling this existing solution is challenging.

Integration complexity: The player part of code for integration is challenging. This is because, in some cases, the player may have to call a sensor API to obtain the bid identifier and then that bid identifier needs to be put in the Ad Request in the right format and field.

BidID structural complexity: There are various restrictions on the structure of the bid identifier (for example, it may be a formatted URL (uniform resource locator)-safe string with a composite structure containing multiple keys) because it will be transmitted over heterogeneous HTTP-based interfaces in the path shown in the example of FIG. 1.

Privacy: For example, as described above, in existing programmatic environments, various targeting and demographic parameters are included in the ad request, where the ad request is forwarded through numerous entities. This is problematic from a privacy perspective, as multiple entities in the ad request data path described above will potentially have access to personal information about users/viewers.

Thus, in existing programmatic ecosystems, content originators and publishers are concerned about leakage of data pertaining to their subscribers (e.g., viewers that subscribe to a streaming service provided by the publisher). Due to this, in existing programmatic systems, ad bid requests are typically empty or devoid of demographic information. This makes it difficult for DSPs to provide targeted advertisements in video streaming.

Further, even if publishers did desire to include viewer information in an ad request, adding information can be challenging. For example, as described above, the ad request is forwarded among numerous entities. Each entity may have its own proprietary protocols for modifying or forwarding ad requests to other entities. For example, if server side ad insertion is used, the publisher contacts a server side ad insertion (SSAI) server (e.g., ad stitcher 106). The SSAI builds an ad request that is sent to the ad server. The ad server forwards that ad request by building another request (e.g., based on the ad request from the SSAI) that is then sent to the SSP. The SSP then builds another request that is sent to the DSP. While the protocol between the SSP and DSP may be standardized, the other protocols for generating/forwarding ad requests by the various other entities in the ad request path are proprietary. Further, there may be many ad servers or SSAI servers, each with their own protocols.

Thus, including information in an initial ad request that is transportable and will survive the repeated forwarding through the various protocols and interfaces of the entities in the ad request path can be challenging. For example, different protocols may have different limits on the amount of information that can be included in an ad request. Thus, information included earlier in the path may cause a request to be rejected later on if it does not conform to the requirements of some entity or component further along the ad request path. This would make it difficult to decide what information to put in the request.

Further, due to the varying protocols, even if information in the initial request were packaged to conform, for example, to the minimum size requirement among all the entities (which may not be easily known), the manner in which the viewer information is included (e.g., in certain fields of the ad request) may not conform to some entity's protocol, also causing the ad request to be dropped.

As described above, each entity in the ad request path that touches the ad request may have their own respective protocol, which limits what viewer information may be included in the ad request. Further complicating this problem is that for each type of entity, there are many different instances. This is another example of a scalability challenge, in addition to those described above.

Thus, in existing programmatic environments, it can be challenging to provide targeting information for an ad request in a manner that both prevents data leakage, and that also allows scalable providing of such viewer information in a real-time manner.

Described herein are direct path resource allocation techniques. The direct path resource allocation techniques described herein include creating a highly synchronized data path in real-time parallel to the Ad Request path from the player, directly to the DSP's network. As will be described in further detail below, the data path synchronization techniques described herein address the aforementioned issues and challenges of scalability, data exposure risk, integration difficulty, and publisher control by providing an alternative path for contextual metadata which is separate or free of the existing advertising ecosystem.

Figure 2:
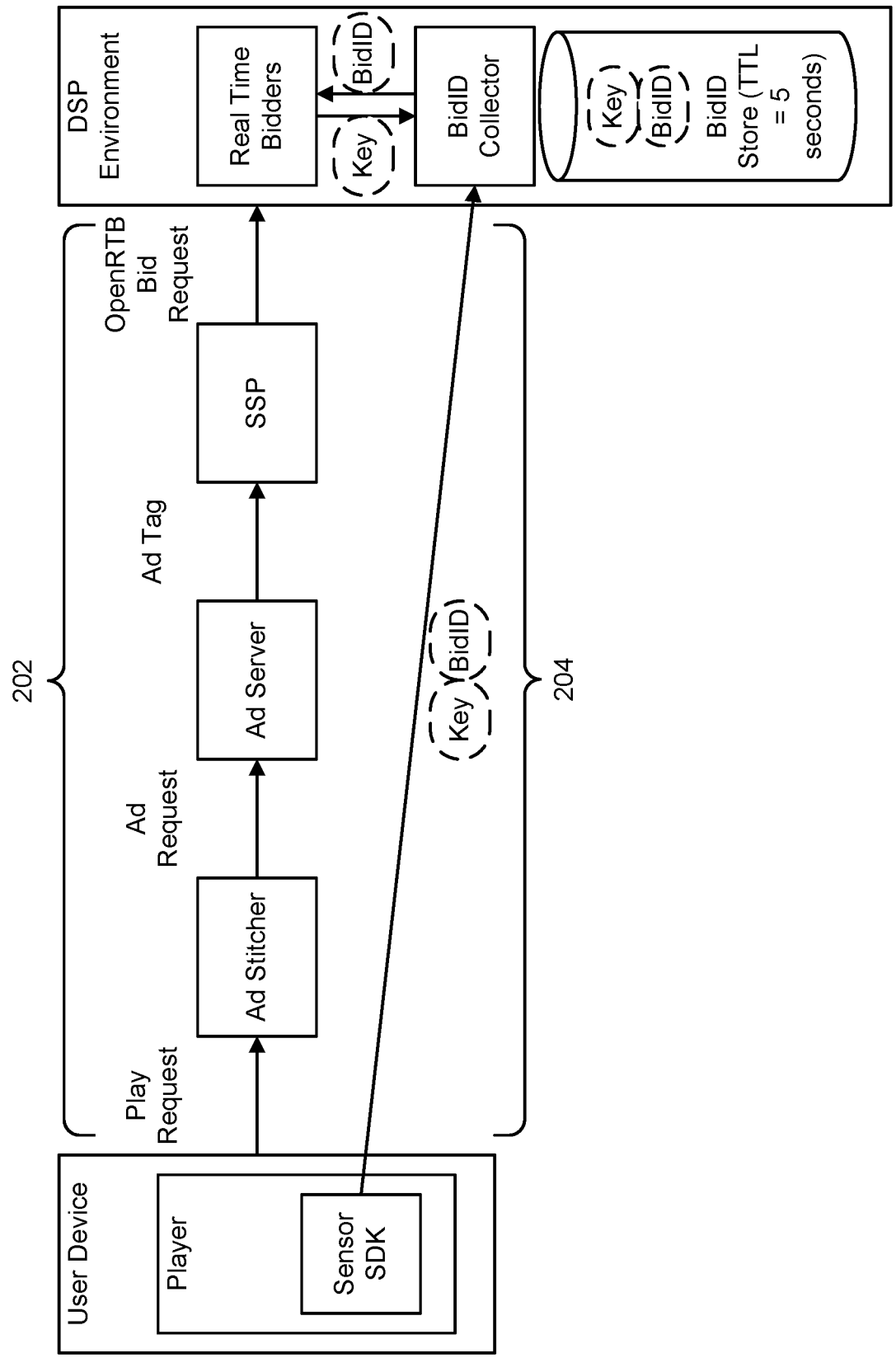
FIG. 2 illustrates an embodiment of a programmatic ecosystem with a synchronized parallel data path.

FIG. 2 illustrates an embodiment of a programmatic ecosystem with a synchronized parallel data path. In this example, FIG. 2 illustrates an embodiment of an environment in which a direct path is provided to carry a bid identifier (or any other piece of contextual metadata related to an ad transaction or ad request) between a user device and a DSP environment.

As shown in this example, two parallel paths are created. One path 202 is an ad request path from the player to the DSP, similar to, for example, as described in conjunction with FIG. 1. In this example, a second path 204 is established and used to communicate information included in bid identifiers, such as contextual metadata used to facilitate bidding on ad requests. Further details regarding the use of a synchronized parallel data path are described below in conjunction with FIG. 3.

The parallel real-time data path 204 is used to provide, separately from the ad request, information (e.g., contextual metadata) related to the ad transaction. The resource allocation techniques described herein further include techniques for synchronizing or otherwise associating a bid request (or ad request) sent on the ad request path with a corresponding matching bid identifier (and related contextual information) that is sent on the separate parallel real-time path.

As a result, as shown in the example of FIG. 2, the parallel direct path is completely agnostic of the existing ad ecosystem. This provides a benefit in that the same solution will work in any programmatic environment. Thus, the resource allocation techniques described herein can be scaled across multiple publishers, DSPs, etc., with less complexity.

Further, contextual metadata, by being provided directly to a DSP, is controllable by a publisher. Here, the publisher (where player 208 is associated with the publisher) can decide what to share or not share with a given DSP, where this may vary for different DSPs. That is, the data sharing platform described herein allows publishers to securely share data with programmatic demand partners (e.g., Demand Side Platforms) in real-time to increase the value of their inventory. In some embodiments, using the data synchronization techniques described herein allows a publisher to granularly control which demand partner is granted access to which data element.

Further, exposure of contextual metadata is limited to being between the publisher and the DSP, which is in contrast to the existing programmatic system, where contextual metadata is included in the ad request that is forwarded among numerous entities in the ad request path. For example, as described above, in the existing programmatic ad ecosystem for connected TV, publishers may face challenges in controlling their data (e.g., content contextual data) that is shared as part of the bidding process. For example, in the existing programmatic ad ecosystem, data (e.g., content metadata, audience data, user demographic data) that is included in the bid may be passed to various entities such as an ad server, to an SSP, which will then send the information to a number of DSPs, where bidding will then happen. That is, intermediate entities will have access to publisher information, and the publisher may not have visibility into how such entities would use the information. Further, DSPs may receive access to data that the publisher does not want them to have.

Using the direct path resource allocation techniques described herein, such data control and exposure issues may be addressed. For example, the direct bid ID path described herein bypasses the existing programmatic ad ecosystem. Further, the direct path bid ID techniques described herein allow publishers to decide what data is delivered to what DSP at a granular level, as described above.

Further, arbitrary contextual metadata information may be provided to the DSP, without being restricted by the variety of protocols that may be put in place by the various entities or components in the ad request path.

Via the direct path and synchronization techniques described herein, the viewer information needed to facilitate improved targeting is also provided in near real-time to allow for real-time advertisement selection.

Thus, using the techniques described herein, a bid identifier (an example of a resource allocation identifier which may include information pertaining to contextual metadata) is provided to a DSP directly, via an alternate path than the ad request. In some embodiments, the resource allocation identifier is received before the ad request is satisfied. Further, using the techniques described herein, the ad request and the transaction identifier sent via the two different paths are synchronized or otherwise related to each other at the DSP.

Thus, as will be described in further detail below, using the techniques described herein, contextual metadata, such as demographic or targeting information pertaining to a viewer, may be provided in a real-time manner that protects the privacy of users and prevents leakage of data.

Figure 3:
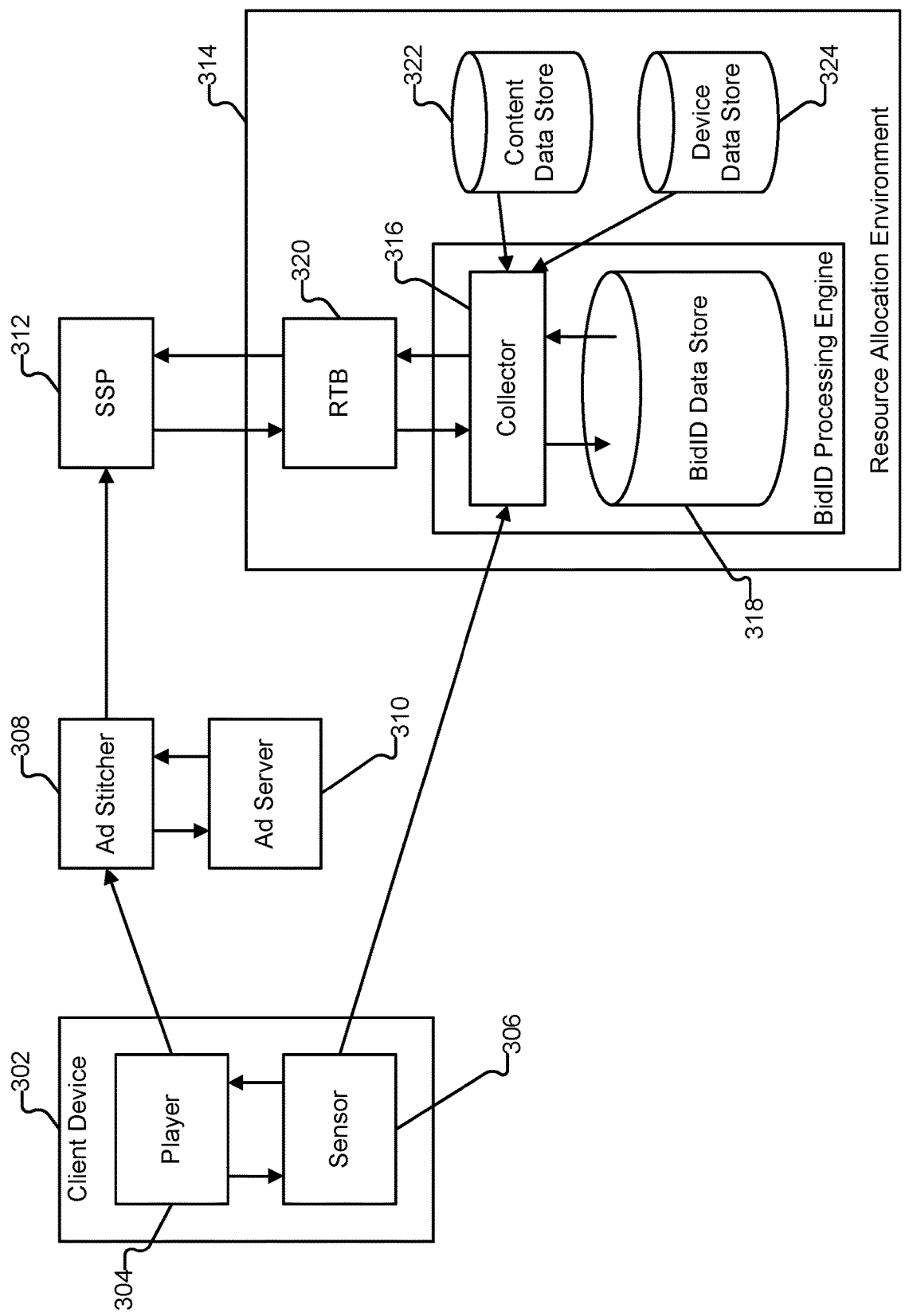
FIG. 3 illustrates a system for resource allocation synchronization.

FIG. 3 illustrates a system for resource allocation synchronization.

Player Side Processing

In this example, suppose that a user clicks on the player of their user device (302), for example, to watch a desired or selected content item. In response to the user clicking on the player, a player object (304) is created. A sensor object (306) is also created. Prior to sending an ad request, the player object is instructed to call the sensor object (e.g., via an API), to create and transmit a corresponding bid identifier.

Initializing the Bid Identifier

In this example, an API exposed by the sensor object is called to initialize and send a bid identifier. In some embodiments, the sensor also stores an identifier of the device, such as the public IP (Internet Protocol) Address.

The following are examples of arguments that are passed to the sensor object as part of making the call to initialize and send the bid identifier:

Content identifier

Channel identifier—In some embodiments, the channel identifier is the channel name. The channel identifier may also be a hash or other function of the channel name. In some embodiments, the channel identifier refers or points to a set of channel level metadata/information (e.g. channel-name, channel-category (e.g., sports, news, shows), etc.).

Stream-type (e.g., live or video-on-demand (VOD))

As will be described in further detail below, these and other parameters are used to build the bid identifier.

Creating the Bid Identifier

In some embodiments, the bid identifier (also referred to herein as a resource allocation identifier) includes two portions. One portion is the payload, which includes contextual metadata or information usable to obtain the contextual metadata. The other portion of the transaction identifier includes a set of keys. As will be described in further detail below, the keys are used to match the bid identifier to a corresponding ad request, which is sent on a different, parallel path to the bid identifier.

Key Portion

As described above in conjunction with the example of FIG. 2, and as also shown in the example of FIG. 3, the ad request is delivered to the DSP in one data path, and the transaction bid identifier is delivered via a synchronized parallel data path. The DSP may be receiving numerous ad requests contemporaneously (e.g., millions of ad requests per second). In some embodiments, the DSP is configured to perform synchronization to identify, for a given ad request, a matching or corresponding bid identifier.

In some embodiments, the matching is performed via a set of keys, where the same set of keys relates an ad request and its corresponding bid identifier. That is, a set of keys common to both the ad request and the bid identifier is determined using parameters that are sent via both the ad request and its corresponding bid identifier (where the ad request may be subject to various restrictions based on what can be included in it).

In some embodiments, the set of keys is a combination of one or more parameters that are included in the key portion of the bid identifier.

One example of a key included in the key portion of the bid identifier is a publisher identifier. The publisher identifier may be used to partition bid identifiers to a particular publisher (as a DSP may receive bid/ad requests associated with multiple publishers). The publisher identifier is typically included in the standard ad request. Another example key or parameter included in the key component of the bid identifier is an IP (Internet Protocol) Address, such as a public IP address. The public IP address is typically also included in an ad request. As another example, the key portion includes keys related to device information pertaining to the client device, such that the device parameters provide a type of device signature. In various embodiments, the device information parameters include platform type (e.g., operating system such as Android, iOS, Windows, etc.), user agent, browser identifier, etc. Other parameters or keys may be included in the key portion of the bid identifier, as appropriate.

As described above, using the techniques described herein, the bid ID is sent via a path that is different than the path of the ad request (where the ad request ultimately results in a bid request, such as a standard compliance bid request). In some cases, because of the direct path for the bid identifier, the bid identifier may arrive before the actual bid request (because, for example, the bid request is coming through the ad ecosystem and passing through/being transformed by multiple entities such as an ad stitcher 308, ad server 310, SSP 312, etc.). Thus, in some embodiments, the direct path bid identifier includes the aforementioned set of keys to serve as keys to facilitate matching between ad requests and bid identifiers. This allows the direct bid ID, which arrives at the DSP via a first path, to be matched with a bid request that arrives via a different path. This is in contrast to existing bid IDs, which typically come with or "piggyback" on ad request/bid request objects, and thus do not need such keys (as matching need not be performed since the bid ID is not sent on a separate channel from a bid request).

In the above example, the key portion of the bid identifier includes a number of keys that are used to index bid identifiers and facilitate finding matching bid identifiers for ad requests, as will be described in further detail below. In some embodiments, the key portion includes a single key that is generated as a function of multiple parameters such as those described above (e.g., by performing a hash on the values). However, in some cases, the use of the hash obfuscates the individual parameters (which may form a hierarchy), and would not allow for partial matches (e.g., a match on subsets of parameters). For example, if the key portion of the bid identifier is implemented as a set of individual and separate keys, partial matches may be performed later on, even if, for example, a value such as the device operating system is not included in the bid identifier. The key portion of the bid identifier may also include a combination of both individual keys as well as composite keys that are functions of multiple values.

Payload Portion

In some embodiments, the payload portion of the bid identifier includes information associated with contextual metadata that is usable to facilitate bidding on the ad request sent via the other communication path. For example, the payload may be used to provide additional information (e.g., user information, device information, content information, etc.) that may be used by the DSP when determining how much to bid on a given ad request, as well as to select an appropriate advertisement for the given ad request. That is, the contextual metadata may be used by advertisers (on the DSP) for advanced targeting, thus driving favorable bid responses from the DSP.

Examples of contextual metadata include client device information, viewer information, content information pertaining to the content being watched by a viewer, etc. With respect to the payload, by sending contextual metadata via the parallel path to the ad request, the information that may be included in the payload is not constrained as it would be if the ad request were used to convey the payload (as in existing programmatic ecosystems, such as that described in conjunction with FIG. 1). For example, in existing real-time programmatic bidding ecosystems, there are restrictions on the structure of existing bid IDs and what may be put inside the bid ID. For example, as described above, existing bid IDs may be required to be of a certain maximum length, be a single string, etc. This is due to the existing ad ecosystem having, as described above, multiple components with heterogeneous APIs (Application Programming Interfaces) that existing bid IDs must pass through.

In some embodiments, the direct path bid identifier described herein does not have such restrictions, as the bid ID, in some embodiments, is generated by sensor (e.g., software development kit (SDK)) code (e.g., sensor 306) that is sent directly to a collector/receiver service at the DSP (described in further detail below), where in some embodiments, both the sensor on the client and the collector service are provided by the same entity. Thus, in some embodiments, the direct Bid ID described herein does not need to adhere to the restrictions on existing bid IDs. Rather, the direct bid ID may be sent, for example, as a protocol message (e.g., binary packed Protobuf message) or in a format such as JSON, as described in further detail below.

Further, the direct bid ID is extensible, and the amount/type of information included in the payload of the direct bid ID may be adjusted/changed.

In various embodiments, the contextual metadata in the payload includes:

Viewer information, such as an audience identifier or subscriber identifier. In some embodiments, the identifier, such as a subscriber identifier (e.g., a user's subscriber ID for a publisher), is anonymized or otherwise obfuscated or de-identified so that the actual value of the identifier is not revealed to the DSP.

Client identifier, such as an identifier of the specific instance of the client application installed on the device from which the ad request originates.

Content information pertaining to the content item selected by the viewer to stream or otherwise view.

Session identifier of the streaming session for which the ad request is being made.

Channel identifier.

Stream-type, such as live or video on demand (VOD).

Transaction information. In some embodiments, transaction information includes dynamic information pertaining to the corresponding ad transaction request and the particular time that the viewer will be viewing the ad. In some embodiments, such transaction level data includes device level data, which includes data that changes dynamically and may only be known at a client device at the time of a transaction. This may include an indication of a type of ad slot for which a corresponding ad request is being made (e.g., pre-roll, mid-roll, or post-roll). Information indicating what previous ads had been played may also be provided. Other examples of dynamic information include the playhead time (e.g., of when exactly an ad is being played inside playback of a content item) and the behavior of the viewer, such as whether they are skipping through the content they selected to view, or are watching it linearly. Other examples of information pertaining to the current viewer include viewer experience information, such as the experience of the viewer pertaining to the current viewing session (e.g., is the video not playing well, as measured by buffering events, etc.). Such transaction level data may be provided in real-time in a bid ID for use in bidding (as such data may become stale or not applicable at a later time).

Contextual Metadata Identifiers

In some embodiments, rather than including granular or specific contextual metadata values for contextual metadata fields in the bid ID, the direct path bid ID includes higher level identifiers (also referred to herein as "contextual metadata identifiers"), such as a content identifier, channel identifier, stream-type, client identifier, session identifier, etc. described above. In some embodiments, the identifiers are de-identified (e.g., via a one-way hash to address data privacy concerns of identifiers of the content, of the user, etc.). For example, with respect to content metadata, rather than sending within the bid identifier metadata specifying a specific genre, episode number, season number, or content length of the content being watched by a viewer in the bid ID, the bid ID includes a content identifier of the content.

In some embodiments, to protect privacy, the keys used for matching (of the bid request and bid ID provided via different paths) are also de-identified. For example, the public IP may be de-identified (e.g., using a hash so that the actual public IP is not made known to the entities in the ad ecosystem path), where the same de-identified public IP is used in the key of the bid identifier, as well as in the bid request for consistency (so that the matching can be performed at the DSP).

In some embodiments, as will be described in further detail below, the higher level contextual metadata identifiers are used to query data stores to obtain the contextual metadata pertaining to the identifier. As will be described in further detail below, such identifiers may be used to obtain additional or actual target values. As one example, the bid identifier payload includes an identifier of a content item. A query is made at the DSP side using the content identifier to obtain additional metadata pertaining to the particular content item (e.g., content name, episode number, etc.). Further details regarding the use and implementation of such higher levels of contextual metadata will be described below.

Sending the Bid Identifier

In some embodiments, the bid identifier is binary encoded (e.g., Protobuf). Other formats, such as JSON, may be used to encode the bid identifier. The bid identifier is then sent by the sensor object 306 directly to the DSP (resource allocation platform 314) via the parallel path described herein. For example, the transaction identifier is sent as an out-of-bound packet, and is directly addressed to a known address of the DSP. This is in contrast to the ad request message, which as will be described in further detail below, is sent in a separate message that is directed or addressed to another entity, such as ad stitcher 308.

The bid identifier may be sent to the DSP via various protocols. As one example, the bid identifier may be sent via HTTP (hyper-text transfer protocol), with the bid identifier in the body of a packet or set of packets. For example, the bid identifier is sent over an HTTP direct connection to the collector 316 on the DSP 314. As another example, since the bid identifier is directly delivered to the DSP, other protocols, such as UDP (user datagram protocol), are used (e.g., where the bid identifier is implemented as a UDP packet).

The sensor 306 instructs the device 302 to send a message including the transaction identifier to the particular DSP that the publisher has a relationship with (DSP 314 in this example). As the transaction identifier need not be included in the ad request, the publisher need not be guided on how to insert the transaction identifier (and its associated payload) in the ad request. Further details regarding sending of the ad request are described below.

Sending the Ad Request

Subsequent to using the API provided by the sensor to make a call (e.g., invoke a function or call a function) to create the bid identifier (and have it sent to the DSP), the player sends an ad request (e.g., an Open RTB bid request, where there is one bid identifier per bid request). For example, the player object 304 is instructed to immediately make a call to create/send the ad request, after initializing the bid request using the API exposed by the sensor object, as described above. For example, the player object sends a play request for a particular content item. The particular content item is associated with metadata that includes information pertaining to advertisement slots. In some embodiments, the ad request made by the player is forwarded to another server (e.g., ad stitcher 308) which generates multiple ad requests based on the number of advertisement slots to be filled. In other embodiments, the player 304 directly makes ad requests for each ad slot. The ad request may be made via an API. The ad request may either be transmitted to an SSAI (server side ad insertion) server (such as ad stitcher 308), or an ad server (such as ad server 310), depending on configuration.

As will be described in further detail below, in some embodiments, an ad request message sent from the player (or was caused to be sent by the player) eventually lands, for example, as an OpenRTB Bid Request message at the DSP 314. In a server-side ad insertion case, the total path may take five network hops, and the latencies of each interface are additive. In some embodiments, the SSP (supply side platform) 312 processing runs auction with multiple DSPs, and if there is sequential processing involved, this may also incur some delay in the ad/bid request path.

In the above example, a first API call is made to create and send a bid identifier. This action (performing the first call) is executed in an asynchronous manner. For example, in some embodiments, immediately subsequent to making the call to create and send the bid identifier, and without waiting for confirmation of delivery of the bid identifier, a second API call is made to cause the ad request corresponding to the bid identifier to be created and sent. Thus, in some embodiments, the ad request is sent by the player without waiting for, or requiring, confirmation of delivery of the bid identifier. In this way, the bid identifier is sent in an asynchronous manner (where sending of the ad request is not dependent on confirmed delivery of the corresponding bid identifier).

That is, in some embodiments, the call to generate and transmit the bid identifier and the call to send the ad request are performed sequentially, in order, with the call to make the bid identifier made first, and the call to make the ad request made after the call to make the bid identifier.

Thus, the bid identifier and the ad request in this example are a synchronized pair of messages that are called together. Whenever the player object sees that there is an ad slot to fill (e.g., as the player is playing the content requested by the user), the bid identifier is first created (and transmitted), and then the ad request is sent out.

Thus, in some embodiments, calling of the API to create and send the bid identifier is an asynchronous operation, where after the call is made, the function immediately returns without requiring a response. In some embodiments, the calls are made asynchronously, because waiting for confirmation of delivery of the bid identifier to the DSP would unnecessarily delay the player. Further, even if it were determined that the bid identifier was not delivered, due to the real-time nature of the transactions taking place, it is unlikely that there would be sufficient time to send another bid identifier.

DSP Side Processing

Bid Identifier Processing

As described above, in some embodiments, the resource allocation identifier such as a bid identifier is transmitted in a manner such that it is delivered, with a high likelihood, to the DSP prior to the ad request (so that the ad request does not arrive prior to the transaction identifier, causing bidding on an advertisement slot to occur without using the contextual metadata included in the transaction identifier sent on the parallel communication path).

For example, as the transaction identifier is transmitted by the player prior to the ad request being sent out from the player, as described above, and as the transaction identifier is sent directly to the DSP (e.g., transaction identifier packets are directly addressed to the IP address of the DSP, rather than an ad server or SSAI or other entity, such that there is therefore only a one-hop latency for the transaction identifier), the bid identifier should arrive at the DSP prior to the corresponding ad request. This is in contrast to the bid request on the other path, which will go through multiple hops (because it passes through multiple entities), where there may also be processing delays.

Thus, the transaction identifier will arrive prior to the ad request, where the transaction identifier is waiting at the DSP for the ad request to arrive at the DSP. Further optimizations may be performed to enhance the likelihood that the transaction identifier arrives at the DSP before the bid request. For example, the DSP may place different servers in different geographic regions. The DSP collector (e.g., collector 316) to which the transaction identifier is sent may be selected based on geographical location—for example, the closest DSP collector is selected. The particular corresponding IP address for that DSP collector is obtained. The transaction identifier is sent and addressed to that particular IP address.

In some cases (e.g., due to network errors), the bid request may arrive before the transaction identifier (or the transaction identifier may not arrive at all). In these cases, the bid request is satisfied without the contextual metadata in the transaction identifier.

In the example of FIG. 3, the DSP side platform 314 includes a collector 316 (also referred to herein as a "bid identifier server") configured to collect the transaction identifier. In some embodiments, the transaction identifier collector is secured. In some embodiments, the collector is a light-weight low-latency service in the DSP (demand side platform) site.

In this example, the bid identifiers collected by collector 316 are stored to data store 318, which in some embodiments is co-located with the DSP. In some embodiments, the data store is implemented as an in-memory cache, such as a Redis cache. In some embodiments, the collector 316 stores the bid identifier data in the in-memory data store in a compact format, using the keys specified in the key portion or component of the bid identifier (e.g., the public IP address, publisher identifier, and/or platform-type keys included in the bid identifier).

The following is an example of an entry for a bid identifier in the in-memory data store:

<public-ip, platform-type>=><content-id, channel-id, stream-type, client-id, session-id>

In this example, the bid identifier is inserted into the in-memory data store using the set of keys including the public IP address and platform type. The payload of the bid identifier is stored to the record that corresponds to the public IP address/platform type keys.

Time-to-Live (TTL)

In some embodiments, the bid identifier entries stored in the in-memory data store are set with a time-to-live (TTL). In some embodiments, the TTL corresponds to the maximum amount of time for the corresponding bid request to arrive (while still allowing for the contextual metadata in the corresponding bid identifier to be available for use in facilitating the bidding on the bid request). In some embodiments, the bid identifier entry auto expires after this time. Other TTLs may be used as appropriate. Further details regarding TTLs are described below.

The TTL will limit what bid identifiers can be matched to a given ad request (where the bid identifier will not be available for matching if it has exceeded the TTL). In this way, only bid identifiers that were sent on the parallel path contemporaneously with a corresponding ad request will be considered.

For example, when the bid identifier is inserted into the data store (e.g., based on the keys in the key portion of the bid identifier), the data store places a TTL on the bid identifier or entry corresponding to the bid identifier. For example, a bid identifier is inserted into the data store with its corresponding set of keys (e.g., combination of public IP address, publisher ID, device OS, etc.).

The data store, such as a Redis cache, expires bid identifiers after the associated TTL has elapsed. In some cases, multiple bid identifiers with the same set of keys may be received (e.g., because a father and daughter are using devices at home with the same operating system at the same time), resulting in a collision. In some embodiments, the data store only permits one entry per unique key (where the most recent bid identifier for a given key overrides any entries that happen to be a collision and have the same set of keys).

The TTL for the bid identifier entries, which defines a window for allowable transactions, may be adjusted (where ad requests also have a time to live, in which a transaction, such as bidding on the ad slot and selection of an ad, should be completed, such as within one second of delivery of the ad request).

Suppose, for example, that a TTL of 5 seconds is selected. Suppose that the DSP receives 1 million ad requests per second. Thus, within a 5 second window, the DSP receives 5 million ad requests in this example.

By using a TTL of 5 seconds, only those bid identifiers that were delivered to the DSP within the last 5 seconds will be in the pool for determining a match to a given received ad request (where identifiers outside of that 5 second window would have expired).

Further, by using a set of keys such as IP address and publisher identifier in the ad request, the bid identifiers that would match to an ad request are those that belong to the same publisher and came from the same public IP address, and that were sent within the last 5 seconds.

The use of both a set of keys along with a TTL window thus reduces the number of collisions that may occur (that is, reduces the number of bid identifiers that could be returned as a result of the search/matching based on the set of keys).

For example, while the use of the public IP address and the publisher identifier limits the bid identifiers that may be provided, there may still be collisions, as the public IP address may relate to a household with multiple devices sharing the same public IP address. The TTL, for example, further limits the bid identifier search space to only those bid identifiers that match on both IP address and publisher identifier, along with the temporal constraint of having occurred in the last 5 seconds (or whatever TTL window was selected). For example, if a user watches multiple content items through the day, resulting in multiple ad requests (and corresponding bid identifiers with the same set of keys), only those bid requests that were made contemporaneously with the ad requests (e.g., within 5 seconds of an ad request) would be returned as matching to a given ad request.

The use of a TTL applied to the bid identifier has other benefits in addition to those described above. For example, without the time to live, a large number of transaction identifiers would need to be stored. This takes storage space, and also increases the search/matching space. Thus, the use of the TTL provides the benefit of decreasing the amount of storage space required to store transaction identifiers, and also improves the speed and efficiency of searching for a match, as it decreases the amount of transaction identifiers that need to be searched.

In some embodiments, the TTL is a system level parameter for the DSP. As described above, the TTL may be adjusted. For example, while the TTL may be lowered to reduce the possibility of collisions (e.g., multiple bid identifiers being identified as matches for a given ad request), lowering the TTL too far may cause a bid identifier to expire before the ad request reaches the DSP. Further, if the TTL is too long, while this may increase the time that an ad request has to arrive at the DSP, in addition to increasing the likelihood of collisions, it will cause an increase in the number of bid identifiers that are stored at any given point in time (and increase the amount of memory required to store received bid identifiers).

In some embodiments, the bid identifier includes a timestamp indicating when it was created or sent out. The timestamp may also be used when performing the search to identify a match to a given ad request.

Additional Details Regarding TTLs

As described above, in some embodiments, the sensor on the player sends the direct path bid ID (e.g., via an API call), and then immediately or otherwise subsequently makes an ad request or play request that involves a call to an ad stitcher or server. In some embodiments, as the direct bid ID is most likely to arrive before the bid request, based on the processing described above, the bid ID has a TTL (time to live), as described above (e.g., 5 seconds as described above), where the corresponding ad request is expected to arrive within the TTL window. The TTL may be set to different values, and may be determined in a variety of ways, taking into account a variety of factors. For example, the public IP used in the key and the bid request may point to multiple devices. For example, the public IP may be the same for an entire office building, or for a household. In some embodiments, the TTL (which specifies the amount of time before the record for the fast direct bid ID is deleted) is selected to prevent collisions on IP addresses from multiple devices, while still accounting for potential latencies/delays in the bid request traveling to the DSP (which may take longer than through the direct path to the DSP that the bid identifier travels). In this way, the TTL window acts as an implied key.

In some embodiments, the TTL is determined based on an analysis of historical information such as publisher data, ad data, content data, etc. For example, analytics may be performed by segmenting a particular day's data into windows of time corresponding to a candidate TTL, and determining how many times it is observed that the same public IP is making multiple ad requests in that candidate TTL window segment. In some cases, it may be observed that there may be requests coming from not only the same public IP, but the same device for the same content (e.g., because there is an ad pod that results in multiple ad requests being generated), in which case, a collision was not observed.

Ad Request Processing

As described above, the player sends a pair of bid identifier and corresponding ad request (which are transmitted on different paths). Not every ad request will necessarily go to the DSP (even though all bid identifiers will reach the DSP since they are sent directly to the DSP, unless they are dropped or not delivered due, for example, to network errors). For example, some ad requests will be rejected by various components in the ad request path, or will not be passed to certain DSPs.

In this example, suppose that an ad request in a bid identifier/ad request pair is delivered to the DSP. The DSP includes various components, one of which includes real-time bidders (e.g., real-time bidder (RTB) 320). The real-time bidder is a server that operates in a low latency, high throughput mode to receive ad/bid requests. The ad requests are structured according to a standard (e.g., Interactive Advertising (IAB) standard). The IAB is associated with the OpenRTB protocol, which includes a request architecture specifying various fields.

The RTB 320 on the DSP receives the ad requests. The ad requests, according to the OpenRTB protocol, may be in various forms, such as JSON or Protobuf. In this example, after receiving the bid request, the RTB is configured to extract parameters, such as publisher identifier, public IP address, device operating system, user identity, etc., which may be placed in standard field locations according to the OpenRTB protocol.

Identifying a Matching Bid Identifier

In some embodiments, the RTB (real-time bidders), after receiving the ad/bid request, extracts various parameters from the bid request. For example, the RTB is configured with logic to extract those parameters from bid requests that are also included in the key portion of bid identifiers. As described above, the use of such coordinated and predetermined parameters to be used as keys provides a safe mechanism by which to perform matching of a bid ID carried via the direct path and a bid request that came to the DSP via an alternate path. In this example, the publisher identifier and public IP (Internet Protocol) address were decided to be used as matching keys, and the publisher identifier and public IP were included in both the ad request and the bid identifier.

In this example, when the bid request arrives (e.g., to the real-time bidder 320), the public IP and publisher ID are extracted from the bid request. The public IP and publisher ID extracted from the bid request are then sent to the receiver/collector service 316 on the DSP. The key parameters may be sent from the RTB to the collector using a low-latency interface (e.g., gRPC remote procedure call).

The DSP uses the public IP and publisher ID extracted from the ad request to make a query of data store 318 for a matching bid identifier that had been received via the direct path. In some embodiments, as described above, the direct bid ID is saved to a local in-memory store 318 of the DSP, using the set of keys including publisher ID/public IP.

In some embodiments, the lookup is performed hierarchically, with only a subset of the parameters extracted from the ad requested used initially, and more parameters being used in a query if needed. For example, initially, the query may be made using only the publisher identifier and IP address parameters. The number of matching bid identifiers that are returned is determined. If there is only one matching bid request that is identified, then the search ends. However, if in this first stage of query, multiple bid identifiers are returned, a next stage or level of querying can be performed on the bid identifiers returned in response to the first stage of query, where additional parameters, such as an operating system and user agent, are used to filter those bid identifiers further to find an exact match.

If a corresponding bid identifier had failed to be delivered, or its TTL had expired prior to the ad request being delivered or the querying having been performed, then the bid identifier will not be in data store 318, and no bid identifier is returned. In this case, bidding is still performed on the ad request, but without the contextual metadata that had been included in the payload of the bid identifier.

If a matching bid identifier is found, the data (e.g., contextual metadata or contextual metadata identifiers) stored for that entry is returned to the RTB server to facilitate resource allocation (e.g., bidding on the ad request).

As described above, in some embodiments, instead of including specific values of contextual metadata for specific fields, when the client device generates the bid identifier, the bid identifier is generated such that the payload includes contextual metadata identifiers usable to obtain additional further information or contextual metadata. As one example, the payload includes a content identifier, channel identifier, client identifier, stream-type, session identifier, etc., where the DSP then performs a query of other data stores. For example, the collector service queries respective data stores (e.g., content data store 322 is queried for contextual metadata pertaining to a content item being viewed, and device data store 324 is queried for contextual metadata corresponding to a particular device identified by the content identifier) with these contextual metadata identifiers to fetch the additional metadata values for the corresponding entities. In some embodiments, such data stores are collocated at the DSP with RTBs, and are managed by the DSP.

Thus, as shown in the above example, in some embodiments, the collector service uses contextual metadata identifiers that were in the payload of a bid identifier to perform further queries of data stores for additional contextual metadata used to facilitate the bidding transaction.

In some embodiments, as an optimization, when the bid identifier is received by the DSP bid identifier server the collector 316 also uses the payload of the received bid identifier to pre-fetch the corresponding metadata values for the identifiers in the payload (e.g., by performing a query of the various contextual metadata servers, as described above). In this way, the detailed contextual metadata (e.g., content genre, viewer information, etc.) is pre-fetched and maintained locally with the bid identifier.

In this way, when an ad request is received later on and a query of the bid ID server is made, the contextual metadata is already cached with the corresponding bid identifier, and the pre-fetched metadata may be provided or returned to the RTB directly as output (without requiring the RTB to receive the bid identifier, extract the contextual metadata identifiers, and then perform another query for contextual metadata at the time of processing of a received ad request).

In some embodiments, the pre-fetched metadata also has a TTL that matches the corresponding bid identifier, and is also removed when the TTL expires (e.g., to save storage space).

In some embodiments, the DSP is in communication with an entity or platform such as a content analytics platform, which, for example, is operated or provided by an entity that also provides the sensor that is collecting data from content playing devices (as well as the collector service on the DSP), and provides analytics on such data (e.g., such as the video that a user is watching, what is the genre of the video, its length, its asset name, etc.). This may include information passed by a publisher, where the analytics platform performs analytics and returns results of the analytics back to the publisher. In some embodiments, the analytics platform provides such data to the DSP. As one example, a periodic batch job is performed in which one or more of the DPS's databases (e.g., content data store 322 and device data store 324) are populated with such data. In some embodiments, the populated data is associated with an identifier that matches to an identifier that is in a bid ID, as described above (that is, the identifier in the data provided to the DSP from the content analytics platform matches to a higher level contextual metadata identifier generated in the client-side sensor (SDK) and included in the bid identifier payload). For example, for a certain content asset, metadata about the asset such as genre, content length, episode number, season number, etc. that is provided to the DSP is also associated with a corresponding content identifier, where the same content identifier is also generated by the client device (from which the bid ID is generated). Thus, in some embodiments, there is a synchronous operation to generate the identifiers.

Thus, in some embodiments, when a real-time bidder obtains a bid ID as a result of the matching described above, the bid ID is opened, and the identifiers from the bid ID are obtained. In some embodiments, the identifiers in the bid ID are then used to access the one or more databases (e.g., content data store 322 and device data store 324) populated with the contextual metadata specific to those identifiers, which can then be used to facilitate bidding.

In some embodiments, the specific contextual metadata associated with the higher level identifiers in the bid ID were provided to the DSP as part of a batch process (where they were stored to the contextual metadata stores). In other embodiments, rather than storing such data on the DSP, the DSP makes a real-time query, for example, to the analytics platform, for the specific data corresponding to an identifier (where it may be specified in the query). In some embodiments, to address latency issues with making such a query to an entity external to the DSP, a server that is in the same or close geographical region to the DSP may be established that includes the contextual metadata to be obtained.

In some embodiments, the above described scheme using higher level identifiers in the payload of the bid identifier provides further control over data exposure concerns of the publisher, as the publisher can control what publisher contextual metadata is provided to what DSP, while only a high level identifier is included in a bid ID or ad/bid request that will pass through the various intermediate entities of an ad ecosystem. Further de-identification of some identifiers (e.g., subscriber identifiers) may be performed, as described above.

Further, by using identifiers rather than including metadata values, the size of the bid ID may be controlled (and made, for example, more lightweight, reducing network resources used). Further, enrichment of metadata from other data sources, or handling of discrepancies in naming conventions may be handled by the content analytics platform. For example, even for the same publisher, the raw metadata for a data field may be different for different platforms (e.g., Roku versus Android). For example, the same content name may be sent, but with the raw content name worded or formatted differently for the different platforms. This may cause issues for the DSP if the raw data for the same content name is coming in differently from different devices. In some embodiments, normalization is performed by an entity such as the analytics platform, which then sends metadata to the DSP that is normalized across the different platforms.

In some embodiments, the DSP is configured to provide differentiated processing to accommodate both bid identifiers that are included in the ad request, as well as bid identifiers that are sent by a separate channel (using, for example, the direct path bid identifier techniques described herein). For example, in some embodiments, when a bid or ad request is received, the DSP is configured to determine whether the bid request includes a transaction identifier and contextual information. For example, in some embodiments, the bid identifier is included in a field of the ad request that is known to the DSP (where the DSP knows what field will have the bid identifier), where the DSP includes logic for extracting information from that field to determine the presence of a bid identifier. If the ad request includes the bid identifier, then a query is not made for a matching transaction identifier, as described above, and the information embedded in the bid request is used directly to select an appropriate ad. If, on the other hand, the bid identifier is not in the bid request, then the synchronization techniques described herein are performed to identify a corresponding transaction identifier that was sent on a parallel path to the ad request, as described herein.

In this way, the direct path bid ID techniques described herein exist in hybrid with existing bid ID mechanisms. In some embodiments, as described above, the RTB on the DSP includes logic to determine whether a bid ID is included in a bid request or was sent via an alternate path (e.g., the direct path described herein). Thus, based on a determination of whether the bid ID is included in the bid request, the RTB/DSP can determine whether or not a bid ID had been sent directly on a parallel path, and whether to query the collector service to identify a matching bid identifier in order to obtain contextual metadata. For example, if a bid ID is directly included in the bid request, then the RTB determines that it does not need to query the collector service. However, if it is determined that the bid ID is not in the bid request, then it is determined that the bid ID was sent via an alternate path. In this case, as described above, the RTB then extracts information/fields from the bid request (e.g., public IP and publisher ID) and uses them as keys to access the collector service and identify a bid ID that had been sent on a path different from the bid request (which is why the bid ID was not in the bid request). Thus, using the key, the RTB is able to determine which bid ID corresponds to which bid request, even though the bid ID and the bid request came via different communication paths.

Facilitating Resource Allocation

In response to the querying by the RTB for a matching resource identifier, if a matching resource allocation identifier is found, the collector service provides the corresponding contextual metadata in a response to the RTB. In some embodiments, the collector service also adds the stream-type as a field. The RTB then uses the contextual metadata (that had been in the payload of the bid identifier and/or obtained by performing a query using at least a portion of the payload information) to facilitate bidding on the corresponding ad request.

The player receives advertisements (e.g., links to the advertisements) which may be inserted into requested content by the client device, or inserted by a server side ad stitcher such as ad stitcher 308, which, for example, generates a manifest file that includes links to the selected advertisements that won the bids.

As shown in this example, by providing contextual metadata information via an alternate path than the ad request path, the contextual metadata information was not passed through the ad request path, and thus privacy of the information was protected from the various components in the ad request path (as it is not exposed at all to those entities on the ad request path). For example viewer behavior information is controlled and is not exposed to other entities in the ad request path. Further, the information that can be made available to the DSP for facilitating improved bid targeting need not be constrained by the limits imposed on ad requests. The publisher's information (e.g., about its subscribers) is also protected.

Other benefits of the resource allocation techniques described herein include:

Advertising ecosystem agnosticism: As described above, in some embodiments, the resource allocation techniques described herein create a highly synchronized data path in real-time that is parallel to the ad request path from the player, directly to the DSP's network. As a result, it is agnostic of the ad ecosystem. This provides a benefit in that the same resource allocation techniques described herein are compatible with any programmatic environment. In this way, the resource allocation techniques described herein may be scaled across multiple publishers, DSPs with much less complexity.

Simpler integration: The integration of such a synchronized data path is simplified for client devices. For example, using the techniques described herein the player need only make a call to the sensor (e.g., library installed on the client device). Nothing else needs to be changed for the player, and as described above, the sensor handles sending of the bid identifier in real-time to the DSP such that it can be fetched by the RTBs in real-time when an ad request arrives.

Increased control over the bid identifier: In some embodiments, the bid identifier is transmitted and received by components (e.g., sensor and bid identifier collector) provided by the same entity. Because of this, there is more control with respect to the properties of the bid identifier, so that the bid identifier may be transmitted more securely and efficiently, with, for example, reduced network latency, greater extensibility, and less exposure of data to other entities, as described above.

Figure 4:
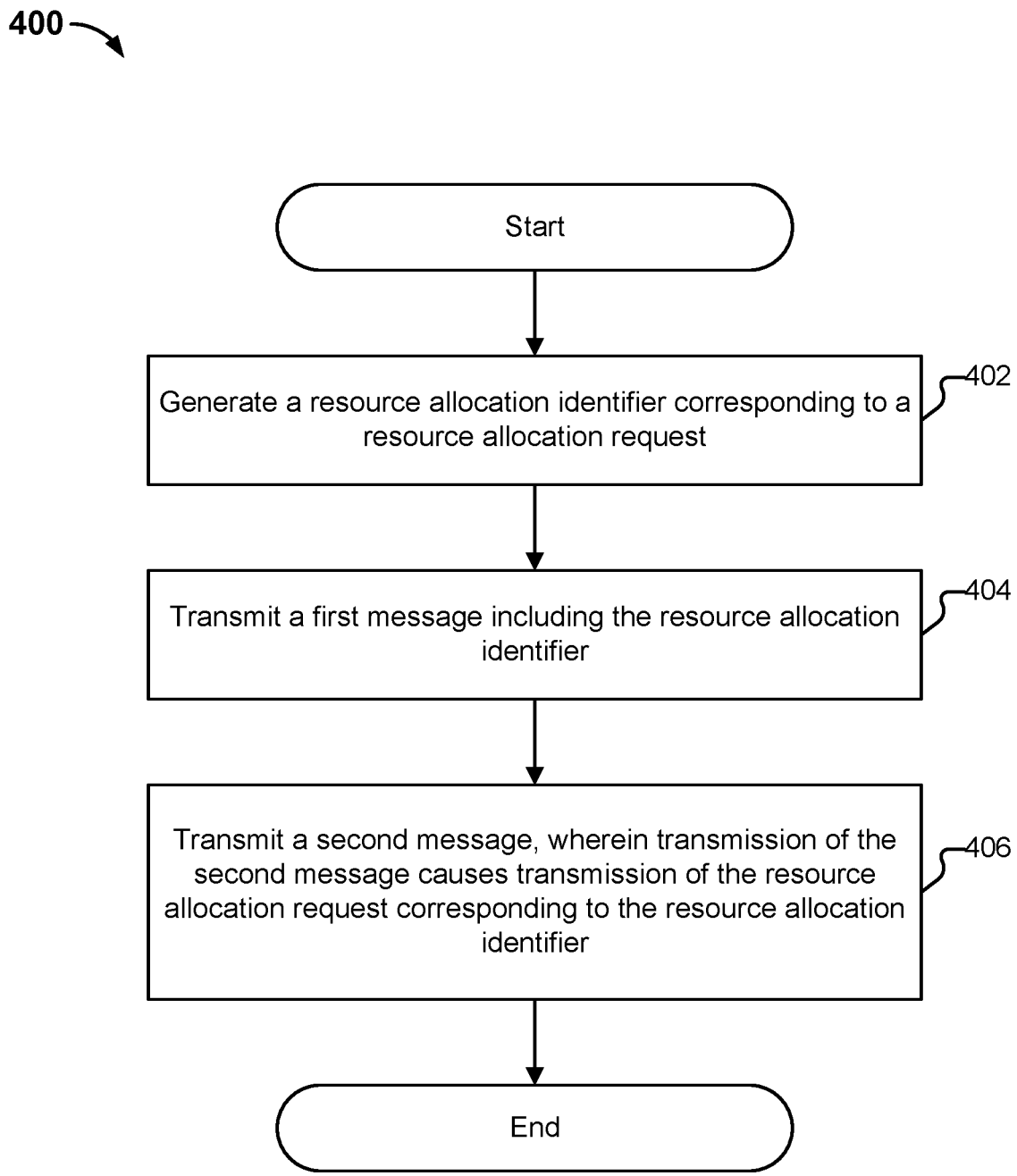
FIG. 4 is a flow diagram illustrating an embodiment of a process for causing a resource allocation identifier and a corresponding resource allocation request to be transmitted via parallel communication paths.

FIG. 4 is a flow diagram illustrating an embodiment of a process for causing a resource allocation identifier and a corresponding resource allocation request to be transmitted via parallel communication paths. In some embodiments, process 400 is executed by client device 302 of FIG. 3. In this example, the process begins at 402 when a resource allocation identifier (e.g., bid identifier described above) corresponding to a resource allocation request (e.g., ad request described above) is generated. For example, the resource allocation request pertains to allocation of a resource associated with streaming of an audiovisual content item (e.g., request for an advertisement to fill one or more ad slots associated with a streaming video session). A first portion of the resource allocation identifier includes a set of keys. Examples of parameters to be used as keys that are included in the key portion of the resource allocation identifier are described above (e.g., publisher identifier, public IP address of the client device from which the resource allocation identifier is transmitted). A second portion of the resource allocation identifier includes a payload. The payload includes information associated with contextual metadata pertaining to the resource allocation request. Examples of contextual metadata are described above. In some embodiments, as described above, the payload includes contextual metadata identifiers usable to obtain the contextual metadata.

At 404, a first transmission is performed. Performing the first transmission includes transmitting a first message including the resource allocation identifier. In some embodiments, the first message including the resource allocation identifier is directed to a first address associated with a first entity (e.g., collector service in a DSP environment, as described above).

In some embodiments, steps 402 and 404 are performed in response to a call (e.g., API call) to initialize and transmit a resource allocation identifier corresponding to a resource allocation request, as described above.

At 406, a second transmission is performed. Performing the second transmission includes transmitting a second message that causes transmission of the resource allocation request corresponding to the resource allocation identifier. For example, the second transmission includes transmission of the resource allocation request (e.g., ad request) or a play request that causes the resource allocation request to be sent. The second transmission is directed to a location or address of a second entity that is different from the first entity (e.g., ad stitcher or ad server versus collector of a DSP environment, to which the message including the resource allocation identifier was addressed). In some embodiments, the second transmission performed at 406 is initiated subsequent to having made the call to initialize and transmit the resource allocation identifier.

Figure 5:
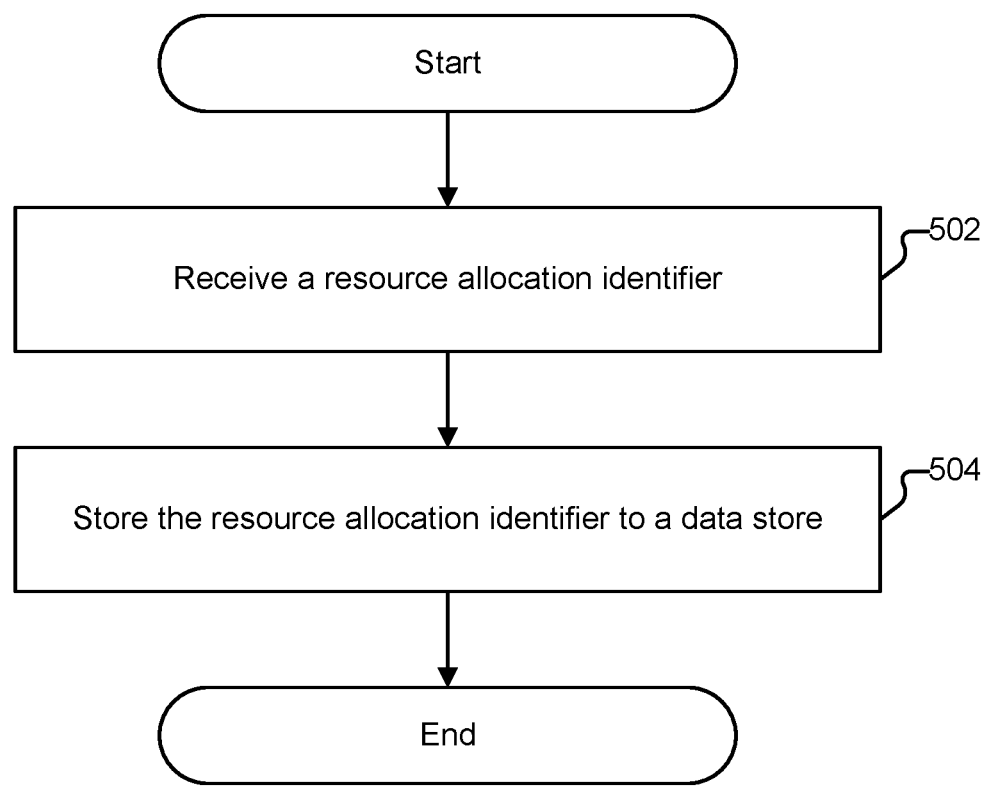
FIG. 5 is a flow diagram illustrating an embodiment of a process for processing a resource allocation identifier.

FIG. 5 is a flow diagram illustrating an embodiment of a process for processing a resource allocation identifier. In some embodiments, process 500 is executed by collector 316 of FIG. 3. The process begins at 502 when a resource allocation identifier (e.g., bid identifier, as described above) is received. As described above, in some embodiments, the resource allocation identifier includes a first portion including one or more keys, and a second portion including a payload of information associated with contextual metadata (e.g., either the contextual metadata itself, or contextual metadata identifiers usable to obtain the contextual metadata).

At 504, based at least in part on the one or more keys in the resource allocation identifier, the resource allocation identifier is stored to a data store. For example, the resource allocation identifier is stored to an in-memory store. As described above, in some embodiments, the resource allocation identifier stored to the data store is associated with a time-to-live (TTL). Further details regarding TTLs are described above.

In some embodiments, as described above, the payload of the bid identifier is included in the record for the bid identifier in the data store. The payload may include contextual metadata and/or contextual metadata identifiers. As described above, in some embodiments, if contextual metadata identifiers were included in the bid identifier, the corresponding contextual metadata is pre-fetched (e.g., by performing a query using the contextual metadata identifiers) and cached when the resource allocation identifier is stored.

Figure 6:
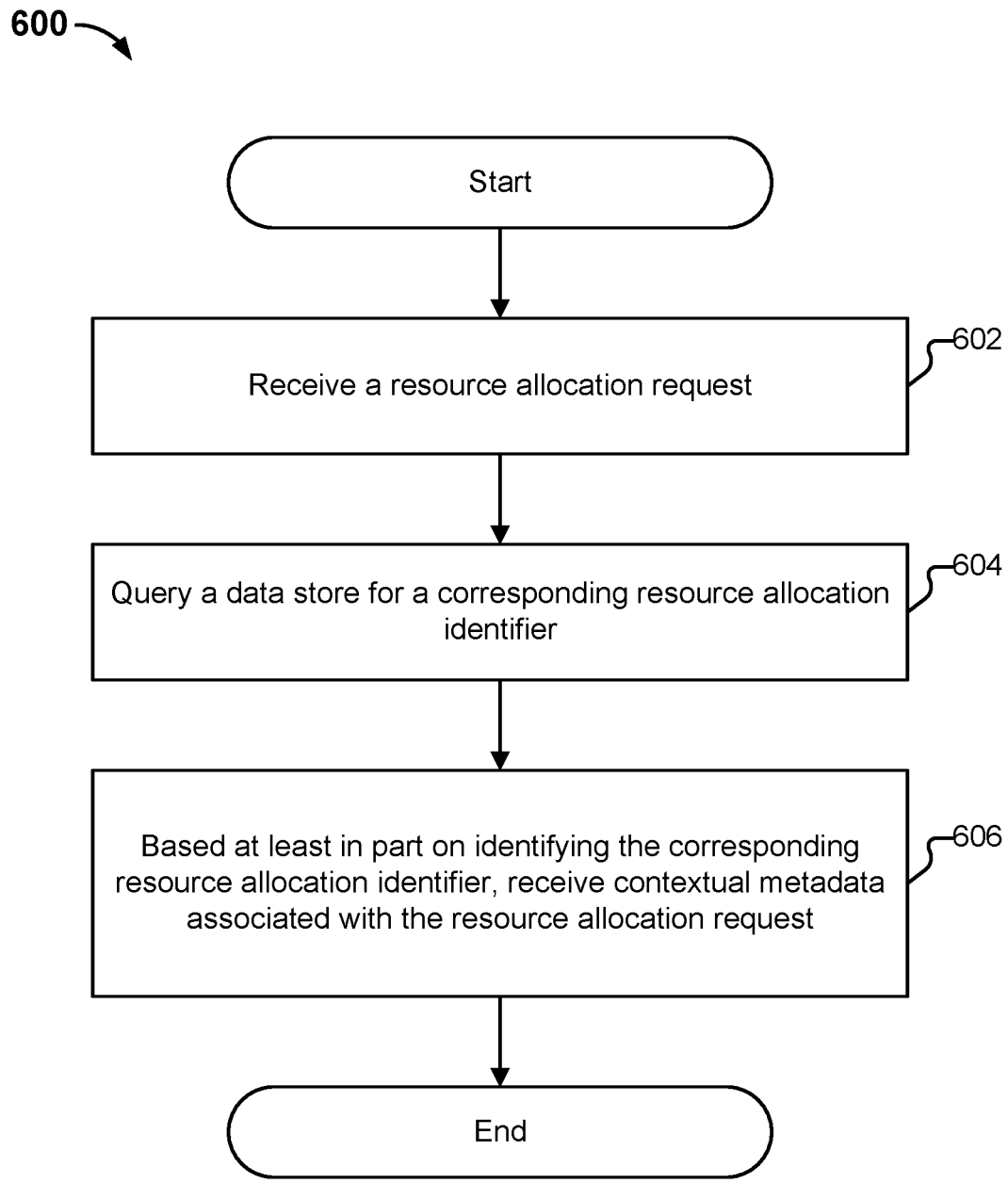
FIG. 6 is a flow diagram illustrating an embodiment of a process for processing a resource allocation request.

FIG. 6 is a flow diagram illustrating an embodiment of a process for processing a resource allocation request. In some embodiments, process 600 is executed by resource allocation platform 314 of FIG. 3. The process begins at 602 when a resource allocation request (e.g., ad request, as described above) is received.

In some embodiments, a set of query parameters is determined from at least a portion of the resource allocation request. For example, as described above, a set of field values is extracted from the resource allocation request to be used as keys in a query to identify a corresponding resource allocation identifier (e.g., bid identifier, as described above). In some embodiments, as described above, the fields or parameters whose values are to be used as query keys may be predetermined, where the same parameters are used between the resource allocation request and the resource allocation identifier, so that matching may be performed.

At 604, a query is made to a data store for a resource allocation identifier corresponding to the resource allocation request (e.g., using the parameters extracted from the ad request, as described above). In some embodiments, the resource allocation identifier was previously received and stored to the data store (e.g., an in-memory data store, as described above) using process 500 of FIG. 5.

If the resource allocation identifier is in the data store, then at 606, contextual metadata associated with the resource allocation request is received. For example, the contextual metadata is directly obtained from the record associated with the resource allocation identifier. As another example, as described above, the record for the resource allocation identifier entry in the data includes contextual metadata identifiers, where the identifiers are used to query further data stores for the contextual metadata. In some embodiments, as described above, the contextual metadata is pre-fetched and cached when the resource allocation identifier was stored (and may therefore be returned directly in response to the query for a matching bid identifier, without requiring additional query of contextual metadata stores). The contextual metadata may then be used to facilitate resource allocation (e.g., selection of an advertisement to fulfill or satisfy the ad request or resource allocation request).

If the corresponding resource allocation identifier is not identified (e.g., because the resource allocation identifier was not delivered, or the resource allocation identifier expired due to exceeding its time-to-live), then resource allocation proceeds without additional contextual metadata, as described above.

Figure 7:
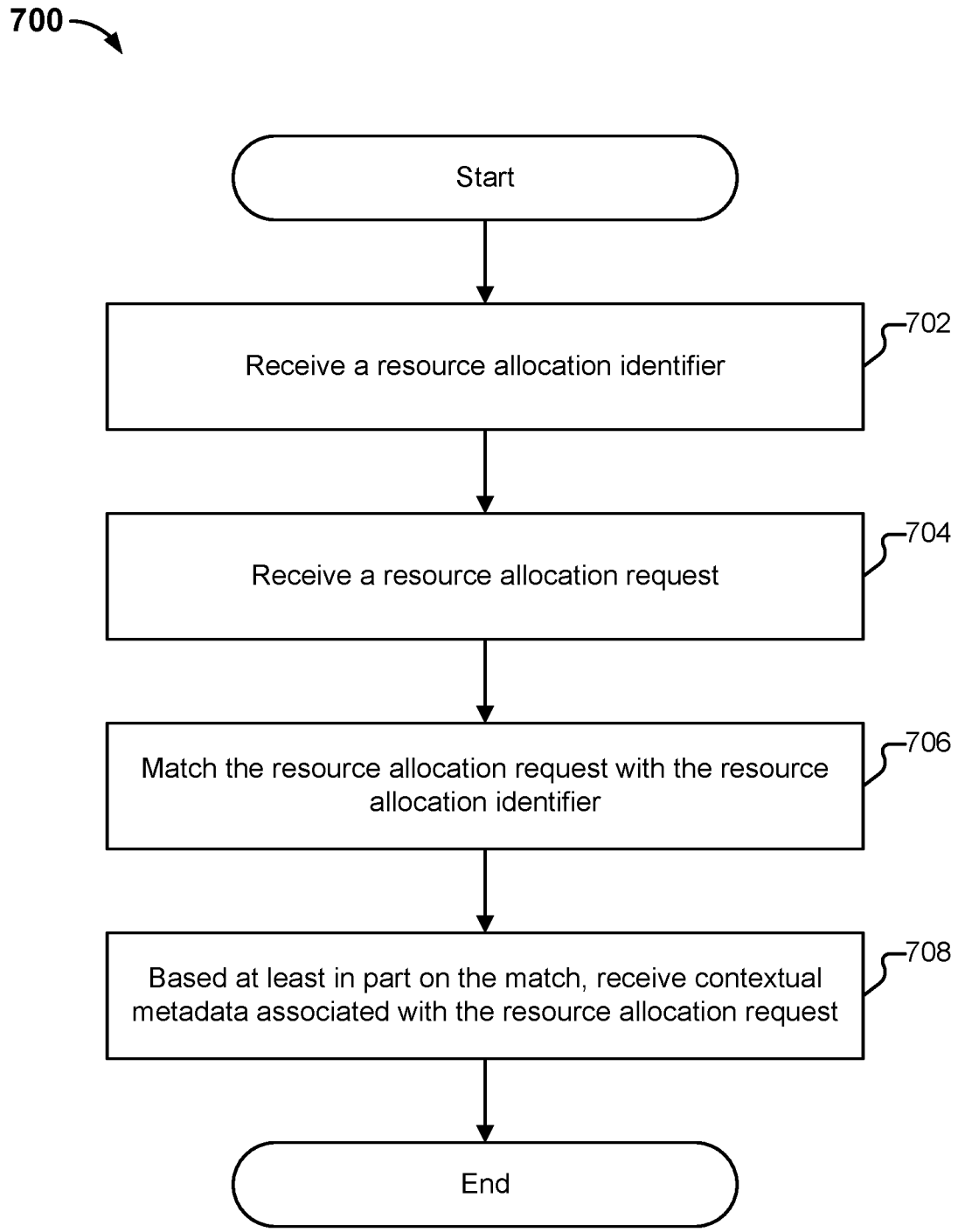
FIG. 7 is a flow diagram illustrating an embodiment of a process for synchronizing a resource allocation request with a resource allocation identifier.

FIG. 7 is a flow diagram illustrating an embodiment of a process for synchronizing a resource allocation request with a resource allocation identifier. In some embodiments, process 700 is executed by resource allocation platform 314 of FIG. 3. The process begins at 702 when a resource allocation identifier (e.g., bid identifier) is received. In some embodiments, the resource allocation identifier is received and stored according to process 500 of FIG. 5.

At 704, a resource allocation request (e.g., ad request, as described above) is received. At 706, the resource allocation request is matched with the resource allocation identifier. At 708, based at least in part on the match, contextual metadata associated with the resource allocation request is received. In some embodiments, steps 704-708 are performed by executing process 600 of FIG. 6. In some embodiments, as described above, resource allocation (e.g., selection of an advertisement to fill one or more ad slots associated with a streaming video session) is facilitated at least in part by using the contextual metadata.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, at a first time, a first message comprising a resource allocation identifier;
at a second time subsequent to receiving of the first message at the first time, receive a second message comprising a resource allocation request pertaining to allocation of a resource associated with streaming of an audiovisual content item;
wherein the first message and the second message are received based at least in part on messages transmitted from a client device that were directed to different entities;
match the resource allocation request included in the second message received at the second time with the resource allocation identifier included in the first message received at the first time;
  subsequent to determining the match, receive contextual metadata associated with the resource allocation request, wherein the contextual metadata is received based at least in part on the resource allocation identifier; and
  facilitate resource allocation at least in part by fulfilling the resource allocation request included in the second message received at the second time using the contextual metadata received based at least in part on the resource allocation identifier included in the first message received at the first time; and
a memory coupled to the processor and configured to provide the processor with instructions.

2. The system recited in claim 1, wherein the resource allocation identifier comprises a first portion and a second portion, the first portion comprising a key, and the second portion comprising information associated with the contextual metadata pertaining to the resource allocation request.

3. The system recited in claim 2, wherein the second portion comprises the contextual metadata.

4. The system recited in claim 2, wherein the second portion comprises a contextual metadata identifier.

5. The system recited in claim 4, wherein the processor is further configured to fetch the contextual metadata at least in part by performing a query of a data store using the contextual metadata identifier.

6. The system recited in claim 1, wherein subsequent to receiving the first message comprising the resource allocation identifier, the processor is further configured to store the resource allocation identifier to a data store based at least in part on a key included in the resource allocation identifier.

7. The system recited in claim 6, wherein storing the resource allocation identifier to the data store comprises associating a time to live with the resource allocation identifier stored to the data store.

8. The system recited in claim 1, wherein subsequent to receiving the second message comprising the resource allocation request, the processor is further configured to determine a key from at least a portion of the resource allocation request.

9. The system recited in claim 8, wherein performing the match comprises using the key to perform a query of a data store for the resource allocation identifier.

10. The system recited in claim 9, wherein the resource allocation identifier is identified in response to performing the query.

11. The system recited in claim 10, wherein the contextual metadata is received in response to identifying the resource allocation identifier.

12. The system recited in claim 10, wherein in response to identifying the resource allocation identifier, the processor is further configured to:
  receive a contextual metadata identifier; and
  receive the contextual metadata at least in part by performing a lookup using the contextual metadata identifier.

13. The system recited in claim 1, wherein the first message was transmitted from the client device, the client device comprising a content player, and wherein the resource allocation identifier was generated at the client device.

14. A method, comprising:
  receiving, at a first time, a first message comprising a resource allocation identifier;
  at a second time subsequent to receiving of the first message at the first time, receiving a second message comprising a resource allocation request pertaining to allocation of a resource associated with streaming of an audiovisual content item;
  wherein the first message and the second message are received based at least in part on messages transmitted from a client device that were directed to different entities;
  matching the resource allocation request included in the second message received at the second time with the resource allocation identifier included in the first message received at the first time;
  subsequent to determining the match, receiving contextual metadata associated with the resource allocation request, wherein the contextual metadata is received based at least in part on the resource allocation identifier; and
  facilitating resource allocation at least in part by fulfilling the resource allocation request included in the second message received at the second time using the contextual metadata received based at least in part on the resource allocation identifier included in the first message received at the first time.

15. A system, comprising:
a processor configured to:
  in response to a request to generate a resource allocation identifier corresponding to a resource allocation request, generate the resource allocation identifier corresponding to the resource allocation request, wherein the resource allocation request pertains to allocation of a resource associated with streaming of an audiovisual content item, and wherein the resource allocation identifier comprises a first portion and a second portion, the first portion comprising a key, and the second portion comprising information associated with contextual metadata pertaining to the corresponding resource allocation request;
  perform a first transmission of a first message including the resource allocation identifier, wherein the first message including the resource allocation identifier is directed to a first address associated with a first entity; and
  subsequent to the request to generate the resource allocation identifier corresponding to the resource allocation request, perform a second transmission of a second message, wherein transmission of the second message causes transmission of the resource allocation request, wherein the second message is directed to a second address associated with a second entity, and wherein the first address and the second address are different; and
a memory coupled to the processor and configured to provide the processor with instructions.

16. The system of claim 15, wherein the second portion comprises the contextual metadata.

17. The system of claim 15, wherein the second portion comprises a contextual metadata identifier usable to obtain the contextual metadata.

18. The system of claim 15, wherein the first portion of the resource allocation identifier comprising the key comprises at least one of (1) a public Internet Protocol (IP) address associated with a client device from which the first transmission of the first message is performed, or (2) a publisher identifier associated with a publisher of the audiovisual content item.

19. A method, comprising:
- in response to a request to generate a resource allocation identifier corresponding to a resource allocation request, generating the resource allocation identifier corresponding to the resource allocation request, wherein the resource allocation request pertains to allocation of a resource associated with streaming of an audiovisual content item, and wherein the resource allocation identifier comprises a first portion and a second portion, the first portion comprising a key, and the second portion comprising information associated with contextual metadata pertaining to the corresponding resource allocation request;
- performing a first transmission of a first message including the resource allocation identifier, wherein the first message including the resource allocation identifier is directed to a first address associated with a first entity; and
- subsequent to the request to generate the resource allocation identifier corresponding to the resource allocation request, performing a second transmission of a second message, wherein transmission of the second message causes transmission of the resource allocation request, wherein the second message is directed to a second address associated with a second entity, and wherein the first address and the second address are different.

* * * * *